United States Patent
Hagio et al.

(10) Patent No.: US 11,229,886 B2
(45) Date of Patent: Jan. 25, 2022

(54) ERI-STRUCTURE ZEOLITE MEMBRANE AND MEMBRANE STRUCTURE

(71) Applicant: NGK INSULATORS, LTD., Nagoya (JP)

(72) Inventors: Takeshi Hagio, Inazawa (JP); Kenichi Noda, Nagoya (JP); Makoto Miyahara, Tajimi (JP); Katsuya Shimizu, Nagoya (JP); Aya Miura, Nagoya (JP); Ryotaro Yoshimura, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 28 days.

(21) Appl. No.: 16/572,814

(22) Filed: Sep. 17, 2019

(65) Prior Publication Data

US 2020/0009512 A1  Jan. 9, 2020

Related U.S. Application Data

(63) Continuation of application No. PCT/JP2018/010203, filed on Mar. 15, 2018.

(30) Foreign Application Priority Data

Mar. 31, 2017 (JP) .............................. JP2017-071538

(51) Int. Cl.
| | |
|---|---|
| *B01D 71/02* | (2006.01) |
| *B01D 69/10* | (2006.01) |
| *C01B 39/46* | (2006.01) |
| *C01B 39/54* | (2006.01) |
| *B01D 67/00* | (2006.01) |

(52) U.S. Cl.
CPC ............ *B01D 71/028* (2013.01); *B01D 69/10* (2013.01); *C01B 39/46* (2013.01); *C01B 39/54* (2013.01); *B01D 67/0051* (2013.01); *C01P 2002/72* (2013.01)

(58) Field of Classification Search
None
See application file for complete search history.

(56) References Cited

U.S. PATENT DOCUMENTS

| | | | |
|---|---|---|---|
| 6,060,415 A * | 5/2000 | Chao .................... | B01D 71/028 502/214 |
| 6,090,289 A * | 7/2000 | Verduijn .............. | B01D 71/028 210/644 |
| 2004/0116275 A1 | 6/2004 | Benfer et al. | |

(Continued)

FOREIGN PATENT DOCUMENTS

| | | | | |
|---|---|---|---|---|
| CN | 106241830 A | * | 12/2016 | ........... B01D 53/228 |
| JP | 2004-250290 A1 | | 9/2004 | |

(Continued)

OTHER PUBLICATIONS

English language machine translation for CN 106241830 A. Retrieved from https://translationportal.epo.org on Dec. 10, 2020. (Year: 2020).*

(Continued)

*Primary Examiner* — Jason M Greene
(74) *Attorney, Agent, or Firm* — Burr & Brown, PLLC

(57) ABSTRACT

A peak intensity of a (002) plane is greater than or equal to 0.5 times a peak intensity of a (100) plane in an X-ray diffraction pattern obtained by irradiation of X-rays to a membrane surface of the ERI membrane.

5 Claims, 4 Drawing Sheets

(56) References Cited

U.S. PATENT DOCUMENTS

| | | | |
|---|---|---|---|
| 2005/0014371 A1* | 1/2005 | Tsapatsis | B01D 71/028 |
| | | | 438/689 |
| 2005/0139066 A1* | 6/2005 | Miller | B01D 53/228 |
| | | | 95/45 |
| 2016/0001273 A1 | 1/2016 | Xie et al. | |
| 2017/0259214 A1 | 9/2017 | Onozuka et al. | |

FOREIGN PATENT DOCUMENTS

| | | |
|---|---|---|
| JP | 2004-532095 A1 | 10/2004 |
| JP | 2015-044162 A1 | 3/2015 |
| WO | 2016/084845 A1 | 6/2016 |

OTHER PUBLICATIONS

Shenglai Zhong, et al., "Aluminophosphate-17 and Silicoaluminophosphate-17 Membranes for $CO_2$ Separations," *Journal of Membrane Science*, 2016, 520, 507-514.

International Search Report and Written Opinion (Application No. PCT/JP2018/010203) dated May 22, 2018.

English translation of International Preliminary Report on Patentability (Chapter I) (Application No. PCT/JP2018/010203) dated Oct. 10, 2019, 7 pages.

U.S. Appl. No. 16/701,946, filed Dec. 3, 2019, Kenichi Noda.

\* cited by examiner

ERI-STRUCTURE ZEOLITE MEMBRANE AND MEMBRANE STRUCTURE

BACKGROUND OF THE INVENTION

1. Field of the Invention

The present invention relates to a zeolite membrane having an ERI structure and a membrane structure.

2. Description of Related Art

A method is known to typically synthesize SAPO and AlPO zeolite membranes that include an ERI structure and are synthesized using seed crystals having an ERI structure that have been synthesized from a mixed crystal having an ERI structure and an OFF structure (reference is made for example to Journal of Membrane Science, 520, (2016), 507-514, "Aluminophosphate-17 and silicoaluminophosphate-17 membranes for $CO_2$ separations").

The method is disclosed to perform the membrane on a support.

SUMMARY OF THE INVENTION

However, a zeolite membrane having an ERI structure as disclosed in Non-Patent Literature 1 may include the presence of zeolites that have an OFF structure which has larger pores than that of an ERI structure. In addition, since the crystal orientation of the constituent grains has a random orientation, the constituent grains do not tend to bond together. As a result, since the OFF pores enable permeation of components that are not intended to permeate, there are difficulties in achieving membrane denseness, and sufficient separation performance is not exhibited.

The present invention is proposed in light of the situation described above, and has the object of providing a zeolite membrane having an ERI structure and a membrane structure that enhance separation performance.

Peak intensity of a (002) plane is greater than or equal to 0.5 times peak intensity of a (100) plane in an X-ray diffraction pattern obtained by irradiation of X-rays to a membrane surface of a zeolite membrane having an ERI structure according to the present invention.

The present invention enables provision of a zeolite membrane having an ERI structure and a membrane structure that enhance separation performance.

DETAILED DESCRIPTION OF THE INVENTION

Membrane Structure 1

Figure 1:
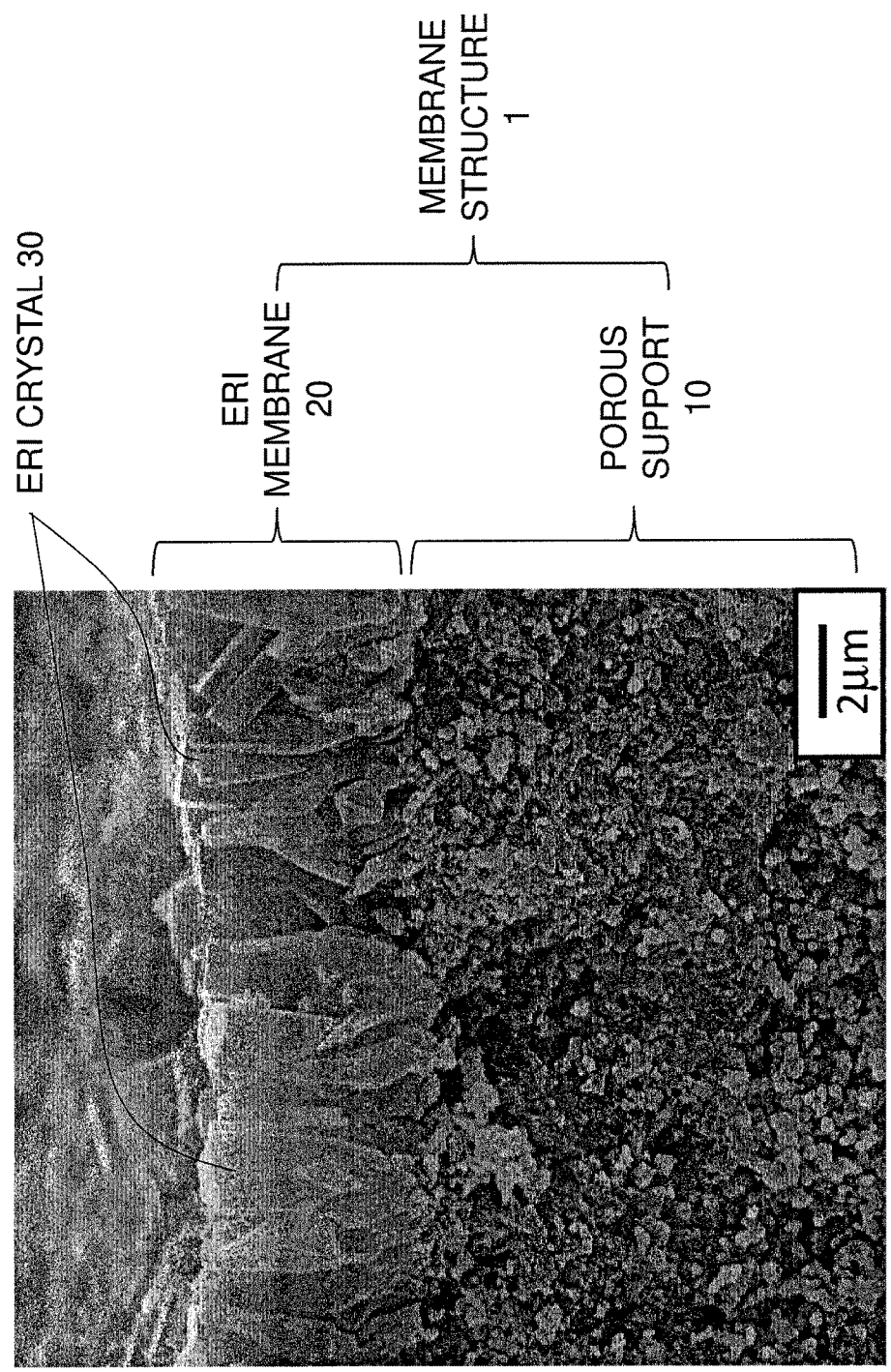
FIG. 1 is a cross-sectional view of a zeolite membrane having an ERI structure.
Figure 2:
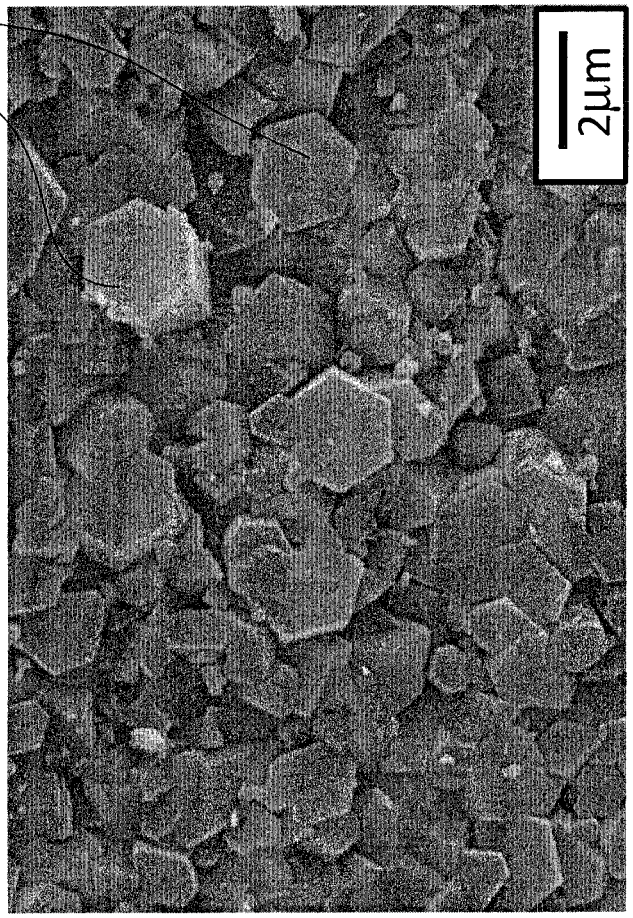
FIG. 2 is a plan view of a zeolite membrane having an ERI structure.

FIG. 1 is a cross-sectional view of a membrane structure 1. FIG. 2 is a plan view of a zeolite membrane 10 having an ERI structure.

The membrane structure 1 includes a porous support 10, and a zeolite membrane 20 having an ERI structure. The zeolite membrane 20 having an ERI structure is configured from zeolite crystals 30 having an ERI structure.

In the description below, the term zeolite membrane 20 having an ERI structure is abbreviated to "ERI membrane 20," and the term zeolite crystals 30 having an ERI structure is abbreviated to "ERI crystals 30."

1. Porous Support 10

The porous support 10 supports the ERI membrane 20. The porous support 10 has chemical stability to an extent that the ERI membrane 20 can be formed (crystallized, applied, or deposited) on a surface of the porous support 10 in the form of a membrane.

The porous support 10 is a ceramic sintered body. Alumina, silica, mullite, zirconia, titania, yttria, silicon nitride, silicon carbide, ceramic sand, cordierite, or the like can be used as the aggregate of the porous support 10. The porous support 10 may contain a binder. A glass material containing silicon (Si), aluminum (Al), titanium (Ti), or the like can be used as the binding material. The content of the binding material may be set to be 20 vol % or more and 40 vol % or less, but is not limited thereto.

The porous support 10 need only have a shape according to which a fluid mixture (gas mixture or liquid mixture) to be subjected to separation can be supplied to the ERI membrane 20. Examples of the shape of the porous support 10 include a monolith-shape, a flat plate shape, a tubular shape, a cylindrical shape, a columnar shape, and a prismatic shape. A monolith-shape refers to a shape having a plurality of cells provided in the longitudinal direction, and has a honeycomb shape. If the porous support 10 has a monolith-shape, the length thereof in the longitudinal direction can be set to 150 to 2000 mm, and the diameter thereof in the radial direction can be set to 30 to 220 mm, but there is no limitation thereon. If the porous support 10 has a monolith-shape, it is possible to form 30 to 2500 channels having a diameter of 1 to 5 mm in the porous support 10.

The porous support 10 is a porous body having multiple open pores. An average pore size of the porous support 10 need only be a size at which a permeation component of the fluid mixture that has permeated through the ERI membrane 20 can pass through pores. The amount of a permeation component can be increased by increasing the average pore size of the porous support 10. The strength of the porous support 10 can be increased by reducing the average pore size of the porous support 10. The average pore size of the porous support 10 is not particularly limited, and can be 0.01 µm or more and 5 µm or less, for example. The average pore size of the porous support 10 can be measured depending on the size of pores using a mercury intrusion method, an air-flow method described in ASTM F316, or perm porometry. The porosity of the porous support 10 is not particularly limited, and can be 25% to 50%, for example.

The average particle size of the porous support 10 is not particularly limited, and can be 0.1 µm or more and 100 µm or less, for example. The average particle size of the porous support 10 refers to an arithmetic average value of the maximum diameters of 30 particles that are measured through cross-sectional observation using a SEM (Scanning Electron Microscope). 30 particles to be measured need only be selected in a SEM image at random.

The porous support 10 may have a monolayer structure in which pores have a uniform size, or a multilayer structure in which pores have different sizes. If the porous support 10 has a multilayer structure, it is preferable that the closer a layer is to the ERI membrane 20, the smaller the average pore size is. If the porous support 10 has a multilayer structure, the average pore size of the porous support 10 refers to an average pore size of an outermost layer that is in contact with the ERI membrane 20. If the porous support 10 has a multilayer structure, each layer can be constituted by at least one selected from the above-described materials, and materials constituting layers may be different from each other.

2. ERI Membrane 20

The ERI membrane 20 is formed on a surface of the porous support 10. The thickness of the ERI membrane 20 is not particularly limited, and can be set to 0.1 μm or more and 10 μm or less. The ERI membrane 20 preferably has a thickness of 0.3 μm or more, and more preferably has a thickness of 0.5 μm or more, in consideration of sufficiently bonding crystals. The ERI membrane 20 preferably has a thickness of 5 μm or less, and more preferably has a thickness of 3 μm or less, in consideration of suppressing cracking caused by thermal expansion.

The ERI membrane 20 is formed in the form of a membrane as a result of a plurality of ERI crystals 30 being linked to each other. Each ERI crystal 30 is a crystal constituted by a zeolite having an ERI structure. The ERI structure refers to a type of structure that meets the definition of an ERI type structure under the IUPAC structural codes as defined by the Structure Commission of the International Zeolite Association.

Examples of zeolites constituting ERI crystals 30 include a zeolite in which atoms (T atoms) located at centers of oxygen tetrahedrons ($TO_4$) constituting the zeolite are constituted by Si and Al, an AlPO zeolite in which T atoms are constituted by Al and P (phosphorus), an SAPO zeolite in which T atoms are constituted by Si, Al, and P, an MAPSO zeolite in which T atoms are constituted by magnesium (Mg), Si, Al, and P, and a ZnAPSO zeolite in which T atoms are constituted by zinc (Zn), Al, and P. A portion of the T atoms may be substituted by other elements.

Each ERI crystal 30 internally has a plurality of oxygen 8-membered ring pores. An oxygen 8-membered ring pore refers to a pore constituted by an oxygen 8-membered ring. An oxygen 8-membered ring is also simply referred to as an "8-membered ring", and is a portion in which the number of oxygen atoms constituting the pore framework is eight, and oxygen atoms are linked to the above-described T atoms to form a ring structure.

Each ERI crystal 30 may contain a metal or metal ion for the purpose of providing a specific component with adsorptivity. Examples of such a metal or metal ion include one or more selected from the group consisting of alkali metals, alkaline earth metals, and transition metals. Although specific examples of transition metals include platinum (Pt), palladium (Pd), rhodium (Rh), silver (Ag), iron (Fe), copper (Cu), cobalt (Co), manganese (Mn), and indium (In), there is no limitation thereon.

Figure 3:
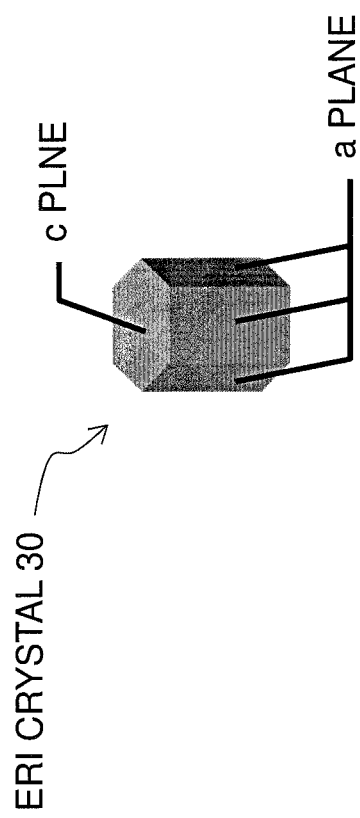
FIG. 3 is a diagram illustrating a configuration of a zeolite crystal having an ERI structure.

Here, FIG. 3 is a schematic figure describing the configuration of an ERI crystal 30. As shown in FIG. 3, an ERI crystal 30 has a hexagonal column shape. Although the cross section that is parallel to the c plane of the ERI crystal 30 preferably is configured as a regular hexagon, there is no limitation thereon. If the cross section of the ERI crystal 30 has a hexagonal shape, the ERI crystal 30 has higher crystallinity than that of an ERI crystal having an indeterminate form, a spherical shape, or an elliptical spherical shape, and it is possible to obtain a membrane having better durability.

A hexagonal c plane ((001) plane) is exposed at an end face of the ERI crystal 30. Respective rectangular a planes ({h00} planes) are exposed at side faces of the ERI crystal 30.

As shown in FIGS. 1 and 2, each ERI crystals 30 are disposed extending upward from the surface of the porous support 10. Each ERI crystals 30 are oriented towards the c plane. Consequently, the c plane is mainly exposed at the outer surface of the ERI membrane, and ERI membranes 30 are mainly bonded via the a plane. Thus, the connectivity of ERI crystals 30 can be increased. Thus, it is possible to increase the denseness of the membrane and achieve sufficient separation performance.

The peak intensity of a (002) plane (c plane) is 0.5 times or more a peak intensity of a (100) plane (a plane) in an X-ray diffraction pattern obtained by irradiation of X-rays to the membrane surface of the ERI membrane 20 using an X-ray diffraction (XRD) method. This means that c plane orientation in the ERI crystal 30 is high. Thus, as a result of making the peak intensity of the (002) plane be 0.5 times or more the peak intensity of the (100) plane, it is possible to improve the separation performance of the ERI membrane 20 to a practicable level.

In an X-ray diffraction pattern, the peak intensity of the (002) plane is preferably 0.9 times or more the peak intensity of the (100) plane, and is more preferably 1.0 times or more the peak intensity of the (100) plane. This makes it possible to further improve the separation performance of the ERI membrane 20.

The peak intensity refers to a value obtained by subtracting a background value from a measured value. An X-ray diffraction pattern can be obtained by irradiating irradiation of CuKα-rays to the membrane surface of the ERI membrane 20 with CuKα-rays using an X-ray diffraction apparatus (manufactured by Rigaku Corporation, model Mini-Flex600). The X-ray output is 600 W (tube voltage: 40 kV, tube current: 15 mA), scan speed is 0.5 degrees/min, a scan step is 0.02 degrees, and an Ni foil having a thickness of 0.015 mm is used as a CuKβ-ray filter. A peak of the (002) plane is observed around 2θ=12 degrees, and a peak of the (100) plane is observed around 2θ=8 degrees.

Method for Manufacturing Membrane Structure 1

1. Preparation of Porous Support 10

A compact is formed by molding a ceramic material into a desired shape using an extrusion molding method, a press molding method, a slip cast method, or the like.

Then, the compact is fired (for example, 900 degrees C. to 1450 degrees C.) to thereby form the porous support 10. The average pore diameter of the porous support 10 may be greater than or equal to 0.01 μm and less than or equal to 5 μm.

If the porous support 10 has a multilayer structure, firing may be performed after coating a slurry that contains a ceramic material onto the surface of the fired compact using a filtration method or the like.

2. Preparation of Seed Crystal

A starting material solution is prepared by dissolving or dispersing T atom sources such as a silicon source, an aluminum source, a phosphorous source or the like and a structure-directing agent (SDA) in pure water. T atoms preferably include two or more of Si, Al and P, and more preferably contain at least Al, P and O because the crystallinity of ERI can be improved. Colloidal silica, fumed silica, tetraethoxysilane, sodium silicate, or the like can be used as a silicon source, for example. Aluminum isopropoxide, aluminum hydroxide, sodium aluminate, alumina sol, or the like can be used as an aluminum source, for example.

Phosphoric acid, sodium dihydrogen phosphate, ammonium dihydrogen phosphate, or the like can be used as a phosphorus source, for example. N,N,N',N'-tetramethyl diaminohexane, cyclohexylamine, or the like can be used as a structure-directing agent, for example.

Then, the starting material solution is introduced into a pressure vessel and performed hydrothermal synthesis (150 to 200 degrees C., 10 to 60 hours) to thereby synthesize the ERI crystals.

Then, ERI seed crystals (seed crystals having an ERI structure) are prepared by adjusting the size of the ERI crystals to an extent that portions of the ERI crystals are locked to openings of pores formed in the surface of the porous support 10. If an average particle size of the synthesized ERI crystals is larger than 0.3 times and is smaller than 5 times an average pore size of an applied surface of the porous support 10, these ERI crystals can be directly used as ERI seed crystals (seed crystals having an ERI structure) as a result of dispersing the ERI crystals. If an average particle size of the synthesized ERI crystals is larger than 0.3 times an average pore size of the applied surface of the porous support 10, ERI seed crystals may be produced by introducing the synthesized ERI crystals into pure water, and deflocculating and crushing the ERI crystals with use of a ball mill or the like so that the average particle size thereof falls within the above-described range. In crushing, the size of ERI seed crystals can be adjusted by changing the crushing time. Although there is no particular limitation in relation to the shape of the ERI seed crystals, the shape may be a hexagonal column, hexagonal plate, cylinder, disc or irregular shape, with an isotropic shape is preferred. An average particle size of seed crystals is preferably 0.3 to 5 times an average pore size of the applied surface of the porous support 10, and is more preferably 0.5 to 3 times the average pore size thereof.

3. Formation of ERI Membrane 20

A seed crystal dispersion solution is prepared by dispersing ERI seed crystals in water, an alcohol such as ethanol, isopropanol, or the like, or a mixed solution thereof.

Then, as a result of filtering the seed crystal dispersion solution onto the surface of the porous support 10, ERI seed crystals are attached to the surface of the porous support 10. At this time, ERI seed crystals are locked to openings of pores formed on the surface of the porous support 10.

Then, a starting material solution is prepared by dissolving or dispersing T atom sources such as a silicon source, aluminum source, phosphorous source or the like and a structure-directing agent (SDA) in pure water.

Figure 4:
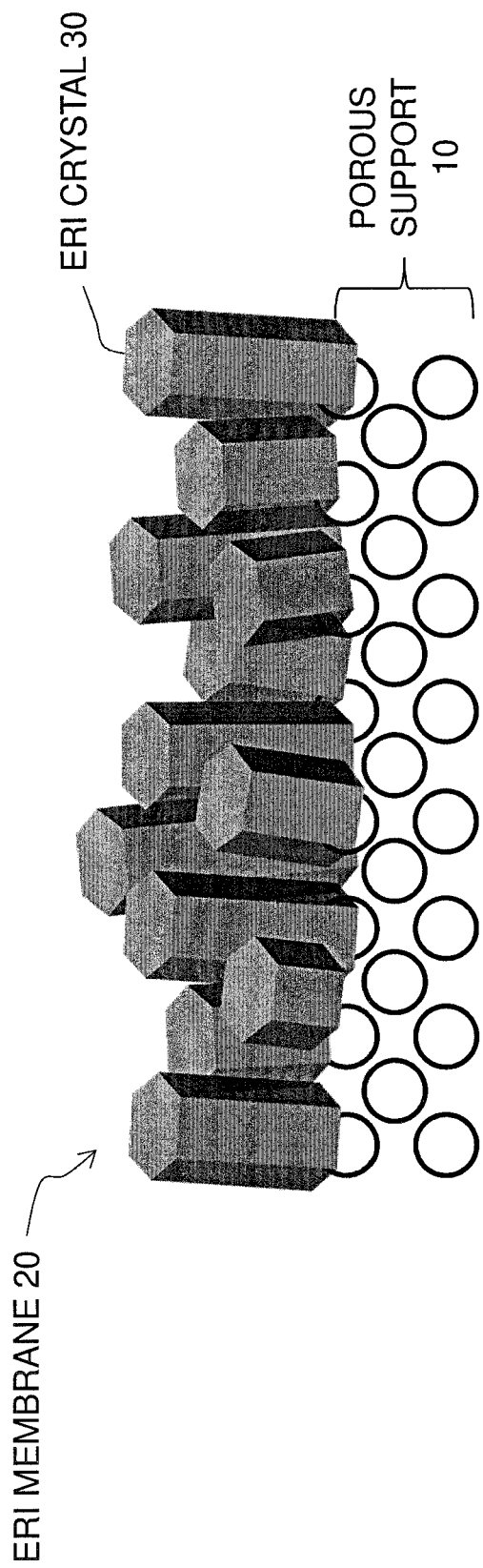
FIG. 4 is a diagram illustrating a method for manufacturing a zeolite membrane having an ERI structure.

Then, the porous support 10 with ERI seed crystals attached is immersed into the starting material solution and hydrothermal synthesis is performed (150 to 190 degrees C., 10 to 60 hours). At this time, ERI seed crystals disposed on the surface of the porous support 10 undergo crystal growth to thereby adjoin the a planes of the ERI structure, and thus, as shown in FIG. 4, upright ERI crystals 30 tend to bond and therefore form an ERI membrane 20.

More specifically, crystal growth of ERI seed crystals is promoted to join the a planes of the ERI structure by a configuration in which the molar ratio of $H_2O/T$ atoms ($H_2O/T$ atoms ratio) is greater than or equal to 30, and the molar ratio of N atoms in the SDA/T atoms (N atoms in SDA/T atoms ratio) is 0.7 to 1.5. When the molar ratio of $H_2O/T$ atoms is less than 30, the ERI crystals may grow in the starting material solution during membrane synthesis and therefore the membrane formation may become difficult by inhibition of seed crystal growth on the porous support. Furthermore, the ERI crystals may not be oriented towards the c plane and therefore the separation performance may be reduced, because ERI crystals that are produced in the starting material solution become attached to the surface on which the seed crystals of the porous support were coated. The $H_2O/T$ atoms ratio is preferably greater than or equal to 60, and more preferably greater than or equal to 120. Furthermore, when the molar ratio of N atoms in the SDA/T atoms is greater than 1.5, ERI crystals may be produced in the starting material solution during membrane synthesis, and therefore the membrane formation may become difficult. In addition, when the molar ratio of N atoms in the SDA/T atoms is smaller than 0.7, the ERI crystals may not be oriented towards the c plane and therefore the separation performance may be reduced. The N atoms in SDA/T atoms ratio is preferably 0.9 to 1.1.

EXAMPLES

Examples of the present invention will be described below. However, the present invention is not limited to the examples described below.

Example 1

1. Preparation of Porous Support

A monolith-shaped compact having a plurality of through holes was formed from a green body containing an alumina raw material by an extrusion molding method, and then was fired.

Then, a porous layer including alumina as a main component was formed on the surface of through holes of the fired compact, and the resulting compact was fired again to form a porous support. A surface of the porous support on which a membrane is to be formed had an average pore size of 65 to 110 nm.

2. Preparation of Seed Crystals

A starting material solution having a composition of $1Al_2O_3:1.3P_2O_5:1.4SDA:130H_2O$ was prepared by dissolving, in pure water, aluminum isopropoxide as an aluminum source, 85% phosphoric acid as a phosphorous source, and N,N,N',N'-tetramethyl diaminohexane (TMHD) as a structure-directing agent.

Then, the starting material solution was introduced into a pressure vessel and hydrothermal synthesis (195 degrees C., 30 hours) was performed.

Then, after recovery of the crystals that resulted from the hydrothermal synthesis and sufficient washing with pure water, the crystals were completely dried at 65 degrees C.

Thereafter, the crystal phase was checked through X-ray diffraction measurement, and the seed crystals obtained by hydrothermal synthesis were ERI crystals.

Then, ERI seed crystals were produced by introducing the synthesized ERI crystals into pure water, in which the ERI crystals are set to be 10 to 20 mass %, and crushing the ERI crystals with use of a ball mill for 7 days. The outer shape of the ERI seed crystals was observed by SEM (electron microscope) and the resulting ERI seed crystals were found to have an irregular shape with a particle diameter of 0.01 to 0.3 μm and an average particle diameter of about 0.2 μm.

3. Formation of ERI Membrane

A seed crystal dispersion solution was prepared by dispersing the ERI seed crystals in ethanol.

Then, as a result of filtering the seed crystal dispersion solution through cells channels of the porous support, ERI seed crystals were attached to inner surfaces of the cells channels of the porous support.

Then, a starting material solution having a composition of $1Al_2O_3:2.1P_2O_5:2.8SDA:1340H_2O$ was prepared by dissolving, in pure water, aluminum isopropoxide as an aluminum source, 85% phosphoric acid as a phosphorous source, and TMHD as a structure-directing agent. In the starting material solution of Example 1, the molar ratio of $H_2O$/T atoms ($H_2O$/T atoms ratio) was 220, and the molar ratio of N atoms in the SDA/T atoms (N atoms in SDA/T atoms ratio) was 0.9.

An ERI membrane was synthesized by immersing the porous support with ERI seed crystals attached into the starting material solution and performing hydrothermal synthesis (160 degrees C., 30 hours).

Then, the synthesized ERI membrane was sufficiently washed with pure water, and then the membrane was completely dried at 65 degrees C. After drying, the $N_2$ permeation amount of the ERI membrane was measured and found to be 0.08 $nmol/m^2 \cdot s \cdot Pa$. Accordingly, it was confirmed that the ERI membrane according to Example 1 had a practicable degree of denseness.

Then, SDA was burned off through heat treatment at 450 degrees C. for 50 hours so that pores passed through the ERI membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 293. Accordingly, it was confirmed that the ERI membrane according to Example 1 had sufficiently practicable separation performance.

The peak intensity of the (002) plane (c plane) was 0.90 times the peak intensity of the (100) plane (a plane) in an X-ray diffraction pattern obtained by irradiation of with X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane (reference is made to FIG. 1 and FIG. 2).

Example 2

1. Preparation of Porous Support

A porous support was prepared in the same process as that of Example 1.

2. Preparation of Seed Crystals

ERI seed crystals were prepared in the same process as that of Example 1.

3. Formation of ERI Membrane

An ERI membrane was synthesized in the same process as that of Example 1, except that the hydrothermal synthesis condition was changed to 160 degrees C. for 30 hours.

Then, the synthesized ERI membrane was sufficiently washed with pure water, and then the membrane was completely dried at 90 degrees C. After drying, the $N_2$ permeation amount of the ERI membrane was measured and found to be 0.005 $nmol/m^2 \cdot s \cdot Pa$. Accordingly, it was confirmed that the ERI membrane according to Example 2 had a practicable degree of denseness.

Then, SDA was burned off through heat treatment at 450 degrees C. for 50 hours so that pores passed through the ERI membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 504. Accordingly, it was confirmed that the ERI membrane according to Example 2 had sufficiently practicable separation performance.

The peak intensity of the (002) plane was 1.19 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane.

Example 3

1. Preparation of Porous Support

A porous support was prepared in the same process as that of Example 1.

2. Preparation of Seed Crystals

ERI seed crystals were prepared in the same process as that of Example 1.

3. Formation of ERI Membrane

An ERI membrane was synthesized in the same process as that of Example 1, except that the composition of the starting material solution was changed to $1 Al_2O_3:2.1P_2O_5:2.8$ SDA: $775H_2O$ and the hydrothermal synthesis condition was changed to 160 degrees C. for 20 hours. It is noted that the starting material solution of Example 3 had $H_2O$/T atoms ratio of 126 and N atoms in SDA/T atoms ratio of 0.9.

Then, the synthesized ERI membrane was sufficiently washed with pure water, and then the membrane was completely dried at 90 degrees C. After drying, the $N_2$ permeation amount of the ERI membrane was measured and found to be less than or equal to 0.04 $nmol/m^2 \cdot s \cdot Pa$. Accordingly, it was confirmed that the ERI membrane according to Example 3 had a practicable degree of denseness.

Then, SDA was burned off through heat treatment at 450 degrees C. for 20 hours so that pores passed through the ERI membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 69. Accordingly, it was confirmed that the ERI membrane according to Example 3 had sufficiently practicable separation performance.

The peak intensity of the (002) plane was 0.54 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane.

Example 4

1. Preparation of Porous Support

A porous support was prepared in the same process as that of Example 1.

2. Preparation of Seed Crystals

ERI seed crystals were prepared in the same process as that of Example 1.

3. Formation of ERI Membrane

An ERI membrane was synthesized in the same process as that of Example 1, except that the composition of the starting material solution was changed to $1 Al_2O_3:2.0P_2O_5:3.0$ SDA: $210H_2O$ and the hydrothermal synthesis condition was changed to 170 degrees C. for 50 hours. It is noted that the starting material solution of Example 4 had $H_2O/T$ atoms ratio of 35 and N atoms in SDA/T atoms ratio of 1.0.

Then, the synthesized ERI membrane was sufficiently washed with pure water, and then the membrane was completely dried at 90 degrees C. After drying, the $N_2$ permeation amount of the ERI membrane was measured and found to be less than or equal to 0.7 nmol/m$^2$·s·Pa. Accordingly, it was confirmed that the ERI membrane according to Example 4 had a practicable degree of denseness.

Then, SDA was burned off through heat treatment at 450 degrees C. for 50 hours so that pores passed through the ERI membrane.

Then, in a separation test using a mixed gas of $CO_2/CH_4$ (50:50) at 0.2 MPaG, the ERI membrane, of which both end portions of the porous support were sealed with a sealing material, demonstrated a $CO_2/CH_4$ permeance ratio of 59. Accordingly, it was confirmed that the ERI membrane according to Example 4 had sufficiently practicable separation performance.

The peak intensity of the (002) plane was 0.51 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane.

Example 5

2. Preparation of Porous Support

A porous support was prepared in the same process as that of Example 1.

2. Preparation of Seed Crystals

ERI seed crystals were prepared in the same process as that of Example 1.

3. Formation of ERI Membrane

An ERI membrane was synthesized in the same process as that of Example 4, except that the composition of the starting material solution was changed to 1 $Al_2O_3$:2.1$P_2O_5$:2.8 SDA: 490$H_2O$. It is noted that the starting material solution of Example 5 had $H_2O/T$ atoms ratio of 80 and N atoms in SDA/T atoms ratio of 0.9.

Then, the synthesized ERI membrane was sufficiently washed with pure water, and then the membrane was completely dried at 90 degrees C. After drying, the $N_2$ permeation amount of the ERI membrane was measured and found to be less than or equal to 0.2 nmol/m$^2$·s·Pa. Accordingly, it was confirmed that the ERI membrane according to Example 5 had a practicable degree of denseness.

Then, SDA was burned off through heat treatment at 450 degrees C. for 50 hours so that pores passed through the ERI membrane.

Then, in a separation test using a mixed gas of $CO_2/CH_4$ (50:50) at 0.2 MPaG, the ERI membrane, of which both end portions of the porous support were sealed with a sealing material, demonstrated a $CO_2/CH_4$ permeance ratio of 162. Accordingly, it was confirmed that the ERI membrane according to Example Shad sufficiently practicable separation performance.

The peak intensity of the (002) plane was 0.99 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane.

Example 6

1. Preparation of Porous Support

A porous support was prepared in the same process as that of Example 1.

2. Preparation of Seed Crystals

ERI seed crystals were prepared in the same process as that of Example 1.

3. Formation of ERI Membrane

An ERI membrane was synthesized in the same process as that of Example 4, except that the composition of the starting material solution was changed to 1 $Al_2O_3$:2.1$P_2O_5$:2.8 SDA: 890$H_2O$ and the hydrothermal synthesis condition was changed to 170 degrees C. for 30 hours. It is noted that the starting material solution of Example 6 had $H_2O/T$ atoms ratio of 144 and N atoms in SDA/T atoms ratio of 0.9.

Then, the synthesized ERI membrane was sufficiently washed with pure water, and then the membrane was completely dried at 90 degrees C. After drying, the $N_2$ permeation amount of the ERI membrane was measured and found to be less than or equal to 0.06 nmol/m$^2$·s·Pa. Accordingly, it was confirmed that the ERI membrane according to Example 6 had a practicable degree of denseness.

Then, SDA was burned off through heat treatment at 500 degrees C. for 20 hours so that pores passed through the ERI membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 186. Accordingly, it was confirmed that the ERI membrane according to Example 6 had sufficiently practicable separation performance.

The peak intensity of the (002) plane was 1.14 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane.

Example 7

1. Preparation of Porous Support

A porous support was prepared in the same process as that of Example 1.

2. Preparation of Seed Crystals

ERI seed crystals were prepared in the same process as that of Example 1.

3. Formation of ERI Membrane

An ERI membrane was synthesized in the same process as that of Example 4, except that the composition of the starting material solution was changed to 1 $Al_2O_3$:2.1$P_2O_5$:2.8 SDA: 1320$H_2O$ and the hydrothermal synthesis condition was changed to 170 degrees C. for 45 hours. It is noted that the starting material solution of Example 7 had $H_2O/T$ atoms ratio of 220 and N atoms in SDA/T atoms ratio of 0.9.

Then, the synthesized ERI membrane was sufficiently washed with pure water, and then the membrane was completely dried at 90 degrees C. After drying, the $N_2$ permeation amount of the ERI membrane was measured and found to be less than or equal to 0.005 nmol/m$^2$·s·Pa. Accordingly, it was confirmed that the ERI membrane according to Example 7 had a practicable degree of denseness.

Then, SDA was burned off through heat treatment at 500 degrees C. for 20 hours so that pores passed through the ERI membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 205. Accordingly, it was confirmed that the ERI membrane according to Example 7 had sufficiently practicable separation performance.

The peak intensity of the (002) plane was 1.04 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were oriented with respect to the c plane.

Comparative Example 1

1. Preparation of Porous Support
A porous support was prepared in the same process as that of Example 1.
2. Preparation of Seed Crystals
ERI seed crystals were prepared in the same process as that of Example 1.
3. Formation of ERI Membrane
An ERI membrane was synthesized in the same process as that of Example 4, except that the composition of the starting material solution was changed to 1 $Al_2O_3$:2.1$P_2O_5$:2.8 SDA: 105$H_2O$. It is noted that the starting material solution of Comparative Example 1 had $H_2O$/T atoms ratio of 18 and N atoms in SDA/T atoms ratio of 0.9.

Then, the synthesized ERI membrane was sufficiently washed with pure water, and then the membrane was completely dried at 90 degrees C. After drying, the $N_2$ permeation amount of the ERI membrane was measured and found to be 5.8 nmol/$m^2$·s·Pa and therefore the ERI membrane of Comparative Example 1 demonstrated a low denseness.

Then, SDA was burned off through heat treatment at 500 degrees C. for 20 hours so that pores passed through the ERI membrane.

Then, in a separation test using a mixed gas of $CO_2/CH_4$ (50:50) at 0.2 MPaG, the ERI membrane, of which both end portions of the porous support were sealed with a sealing material, demonstrated a $CO_2/CH_4$ permeance ratio of 4. Accordingly, it was confirmed that the ERI membrane according to Comparative Example 1 had low separation performance.

The peak intensity of the (002) plane was 0.19 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were not oriented with respect to the c plane.

Comparative Example 2

1. Preparation of Porous Support
A porous support was prepared in the same process as that of Example 1.
2. Preparation of Seed Crystals
ERI seed crystals were prepared in the same process as that of Example 1.
3. Formation of ERI Membrane
An ERI membrane was synthesized in the same process as that of Example 1, except that the composition of the starting material solution was changed to 1 $Al_2O_3$:4.2$P_2O_5$:2.8 SDA: 210$H_2O$. It is noted that the starting material solution of Comparative Example 2 had $H_2O$/T atoms ratio of 20 and N atoms in SDA/T atoms ratio of 0.53.

Then, the synthesized ERI membrane was sufficiently washed with pure water, and then the membrane was completely dried at 90 degrees C. After drying, the $N_2$ permeation amount of the ERI membrane was measured and found to be 1014 nmol/$m^2$·s·Pa and therefore the ERI membrane of Comparative Example 2 demonstrated an extremely low denseness. Due to the insufficient denseness, further evaluation was not performed.

Comparative Example 3

1. Preparation of Porous Support
A porous support was prepared in the same process as that of Example 1.
2. Preparation of Seed Crystals
SAPO seed crystals having an ERI structure were prepared according to the method disclosed in Journal of Membrane Science, 520, (2016), 507-514, "Aluminophosphate-17 and silicoaluminophosphate-17 membranes for $CO_2$ separations."
3. Formation of ERI Membrane
An ERI membrane was synthesized in the same process as that of Example 1, except that SDA was changed to cyclohexylamine, the composition of the starting material solution was changed to 1 $Al_2O_3$:1$P_2O_5$:1 SDA:220$H_2O$, and the hydrothermal synthesis condition was changed to 200 degrees C. by 90 hours. It is noted that the starting material solution of Comparative Example 3 had $H_2O$/T atoms ratio of 55 and N atoms in SDA/T atoms ratio of 0.25.

Then, the synthesized ERI membrane was sufficiently washed with pure water, and then the membrane was completely dried at 90 degrees C. After drying, the $N_2$ permeation amount of the ERI membrane was measured and found to be 1.5 nmol/$m^2$·s·Pa and therefore the ERI membrane of Comparative Example 3 demonstrated a slightly low denseness.

Then, SDA was burned off through heat treatment at 450 degrees C. for 10 hours so that pores passed through the ERI membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 24. Accordingly, it was confirmed that the ERI membrane according to Comparative Example 3 had a low separation performance.

The peak intensity of the (002) plane was 0.39 times the peak intensity of the (100) plane in an X-ray diffraction pattern obtained by irradiation of X-rays to the ERI membrane surface. Furthermore, SEM observation of an exposed cross section in the membrane thickness direction of the ERI membrane and the outer surface of the ERI membrane enabled confirmation that the hexagonal ERI crystals were not oriented with respect to the c plane.

TABLE 1

| | Conditions of Membrane Synthesis | | | | | Evaluation | |
|---|---|---|---|---|---|---|---|
| | Synthesis Temperature [° C.] | Synthesis Time [h] | SDA | H$_2$O/T Atoms Ratio [Mol/Mol] | N Atoms in SDA/T Atoms Ratio [Mol/Mol] | (002)/(100) Ratio | CO$_2$/CH$_4$ Permeance Ratio |
| Example 1 | 160 | 30 | TMHD | 220 | 0.9 | 0.9 | 293 |
| Example 2 | 160 | 40 | TMHD | 220 | 0.9 | 1.19 | 504 |
| Example 3 | 160 | 20 | TMHD | 126 | 0.9 | 0.54 | 69 |
| Example 4 | 170 | 50 | TMHD | 35 | 1.0 | 0.51 | 59 |
| Example 5 | 170 | 50 | TMHD | 80 | 0.9 | 0.99 | 162 |
| Example 6 | 170 | 30 | TMHD | 144 | 0.9 | 1.14 | 186 |
| Example 7 | 170 | 45 | TMHD | 220 | 0.9 | 1.04 | 205 |
| Comparative Example 1 | 170 | 50 | TMHD | 18 | 0.9 | 0.19 | 4 |
| Comparative Example 2 | 160 | 30 | TMHD | 20 | 0.53 | Membrane Denseness Failure | |
| Comparative Example 3 | 200 | 90 | cyclohexylamine | 55 | 0.25 | 0.39 | 24 |

As shown in Table 1, the peak intensity in Example 1 to Example 7 of the (002) plane was greater than or equal to 0.51 times the peak intensity of the (100) plane in an X-ray diffraction pattern obtained by irradiation of X-rays to the ERI membrane surface, and therefore the ERI membrane according to Example 1 to Example 7 had sufficiently practicable separation performance. This feature is due to the fact that the ERI membrane denseness is enhanced by bonding on the a plane of ERI crystals having high c plane orientation.

Furthermore as shown by the comparison of Examples 1, 2 and 5 to 7 with Examples 3 and 4, the separation performance was confirmed to be further enhanced by a configuration in which the peak intensity of the (002) plane was greater than or equal to 0.90 times the peak intensity of the (100) plane.

The invention claimed is:

1. A zeolite membrane having an ERI structure, wherein a peak intensity of a (002) plane is greater than or equal to 0.5 times a peak intensity of a (100) plane in an X-ray diffraction pattern obtained by irradiation of X-rays to a membrane surface of the zeolite membrane.

2. The zeolite membrane having an ERI structure according to claim 1, wherein
the peak intensity of the (002) plane is greater than or equal to 0.9 times the peak intensity of the (100) plane.

3. The zeolite membrane having an ERI structure according to claim 1 or 2, the zeolite membrane comprising two or more of Si, Al and P.

4. The zeolite membrane having an ERI structure according to claim 3, the zeolite membrane comprising at least Al, P and O.

5. A membrane structure comprising
the zeolite membrane having an ERI structure according to claim 1, and
a porous support configured to support the zeolite membrane having an ERI structure.

* * * * *